(12) United States Patent
Park et al.

(10) Patent No.: US 6,373,564 B1
(45) Date of Patent: Apr. 16, 2002

(54) IMAGE TRACKING DEVICE AND METHOD FOR TRANSVERSE MEASUREMENT OF OPTICAL FIBER

(75) Inventors: Yong-Woo Park, Seoul; Dug-Young Kim; Un-Chul Paek, both of Kwangjukwangyok-shi, all of (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/838,022

(22) Filed: Apr. 19, 2001

(30) Foreign Application Priority Data

Aug. 22, 2000 (KR) .............................. 12-48506

(51) Int. Cl.⁷ .............................................. G01N 21/00
(52) U.S. Cl. ..................................... 356/73.1
(58) Field of Search ................. 356/73.1, 375, 356/121; 385/33, 35, 115–117; 382/288, 199, 151, 141, 173

(56) References Cited

U.S. PATENT DOCUMENTS 5,215,489 A * 6/1993 Nakamura ............... 445/4
5,770,001 A * 6/1998 Nagayama et al. ...... 156/350
6,034,779 A * 3/2000 Yamaura .................. 356/375

* cited by examiner

Primary Examiner—Frank G. Font
Assistant Examiner—Tu T. Nguyen
(74) Attorney, Agent, or Firm—Steve Cha; Klauber & Jackson

(57) ABSTRACT

The present invention relates generally to an image tracking device in an optical communication system, and in particular, to a device and method for measuring the transverse characteristics, including the refractive index or residual stress of an optical fiber or a fiber preform.

5 Claims, 6 Drawing Sheets

IMAGE TRACKING DEVICE AND METHOD FOR TRANSVERSE MEASUREMENT OF OPTICAL FIBER

CLAIM OF PRIORITY

This application claims priority to an application entitled, "Image Tracking Device and Method for Transverse Measurement of Optical Fiber," filed in the Korean Industrial Property Office on Aug. 22, 2000 and there duly assigned Ser. No. 2000-48506.

BACKGROUND OF THE INVENTION

1. Field of the Invention

The present invention relates generally to an image tracking device in an optical communication system, and in particular, to a device and method for measuring the transverse characteristics, including the refractive index or residual stress, of an optical fiber or a fiber preform.

2. Description of the Related Art

Hereinafter, the term, "transverse section," relating to an optical fiber (or preform) will refer to the section perpendicular to "the lengthwise section" of the optical fiber (or preform), whereas the term, "longitudinal section" will refer to the section that is parallel to "the length direction" of the optical fiber (or preform).

Various types of image-tracking techniques for tracking the transverse and longitudinal images of the optical fiber (or preform) are available. The transverse measuring device is typically utilized to detect the residual stress and refractive index of an optical fiber (or fiber preform). Despite having a low-image resolution, the transverse measuring device allows a non-destructive testing environment compared to other measurement techniques that are available in the industries related to fiber and fiber fabrication device. Moreover, unlike the longitudinal measuring technique, a polarization distribution effect can be measured accurately using the transverse measuring technique. Therefore, the transverse measurement is more preferred for measuring the characteristics of an optical fiber (or preform).

FIG. 1 illustrates a conventional measuring device for enabling the longitudinal measurement of an optical fiber. For the purpose of illustration, an optical fiber 14 is arranged along the z-axis direction, and the longitudinal section 15 of the optical fiber 14 is aligned in the x-y plane. Parallel light 13, emitted from a light source 11, is focused on the longitudinal section 15 of the optical fiber 14 by a first lens 12. Some portion of the light 13 incident on the transverse section 15 is transmitted into the optical fiber 14, while the other portion of the light 13 is reflected. The reflected light 13 from the fiber 14 is coupled into a second convex lens 16 in backward direction and thereafter determined by an optical detector 17 as light power. Accordingly, the optical detector 17 measures the power of the reflected light received thereon, and the measured power is used to obtain information about the refractive index of the parallel light 13 at the beam spot on the transverse section 15 of the fiber 14. Hence, by implementing this type of parallel light measuring device, the refractive index distribution of the transverse section 15 of the fiber 14 can be derived using the power of the light detected at the detector 17.

FIG. 2 illustrates another conventional measuring device for detecting the transverse characteristics of an optical fiber. As shown in FIG. 2, the optical fiber 23 is arranged along the z-axis direction, and the longitudinal section 24 of the optical fiber 23 is aligned along the x-z plane,. Light 22 emitted from a light source 21 passes through the fiber surface and the longitudinal section 24 of the optical fiber 23 and eventually arrives at the image sensor 25. Accordingly, the image of the longitudinal section 24 can be measured and can determine whether the optical fiber 23 contains beam deflecting sections, which result from different refractive indexes by dopants. To achieve this, the conventional measuring device also includes an image sensor (i.e., CCD) 25 to measure the intensity distribution of light passing through the fiber component 24. Hence, the image of the intended longitudinal section of an optical fiber, including the center of the optical fiber as well as the sectional profiles of an optical fiber, is detected.

However, there are some drawbacks with the above-identified conventional systems, which rely on the diffraction of an optical fiber image. Typically, the transverse image of an optical fiber is detected not by projecting light onto a sample but by transversely radiating the optical fiber with light and then detecting refracted light therefrom. When light is projected onto the outer circumferential surface of the optical fiber, the cylindrical core structure acts as a lens. That is, an optical fiber composed of a core and a cladding with different refractive indices and with a symmetrical cylinder shape has equivalent function as a lens. Thus, the light focusing effect and the light diffraction effect are generated when light passes before and behind the center of the core, respectively. Currently, there is no way to numerically analyze these focusing and diffraction effects caused by the fiber in the conventional image sensor. Therefore, there is a need for a new image-tracking method that is capable of detecting the focusing and diffraction effects caused by the fiber core member.

SUMMARY OF THE INVENTION

The present invention relates to an image-tracking device that can minimize measurement errors caused by the fiber core member in the transverse measurement method.

Accordingly, an image-tracking device that is capable of detecting the transverse characteristics of an optical fiber is provided and includes a linear object; a light source for emitting light onto the light object; a first convex lens for projecting the light received via the linear object onto the outer circumferential surface of the optical fiber and forming a primary image of the linear object penetrating the optical fiber; a second convex lens for converging the light received via the optical fiber and forming a secondary image of the linear object; an image sensor for detecting the secondary image; and, a controller for calculating the distance between the primary image and the center of the optical fiber based on the distortion degree on the detected secondary image.

The present invention provides a method for measuring the transverse characteristics of an optical fiber, a linear object is arranged to be inclined at an angle other than 90° with respect to the transverse direction of the optical fiber. Light is projected onto the linear object and the light that passes through the linear object is focused thereafter. A primary image of the linear object is generated to be within the optical fiber. A secondary image of the linear object is generated by focusing the light that has passed through the optical fiber with a lens 70. As a consequence, the secondary image is detected and a differential curve is derived from the detected secondary image. Finally, the distance between the primary image and the center of the optical fiber is calculated according to the length of a distortion region and distortion peaks on the differential curve.

BRIEF DESCRIPTION OF THE DRAWINGS

The above and other features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. For the purpose of simplicity and clarity, well-known functions or constructions are not described in detail as they would obscure the invention in unnecessary detail.

Figure 1:
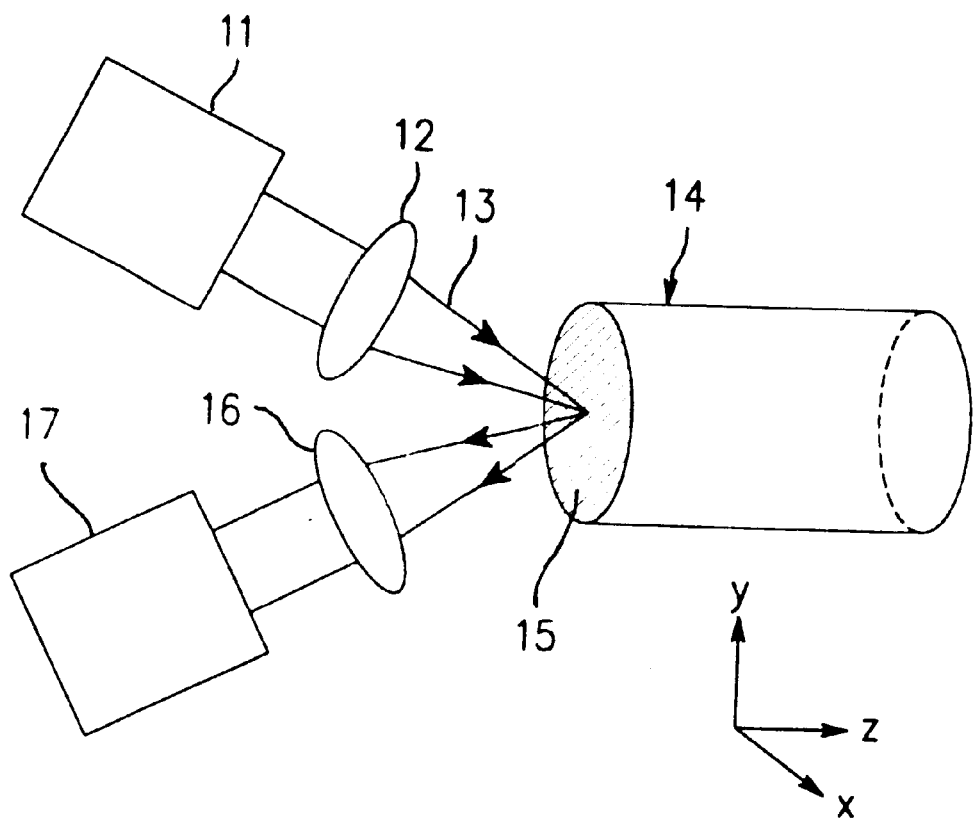
FIG. 1 illustrates a conventional device for measuring the longitudinal characteristics of an optical fiber.
Figure 2:
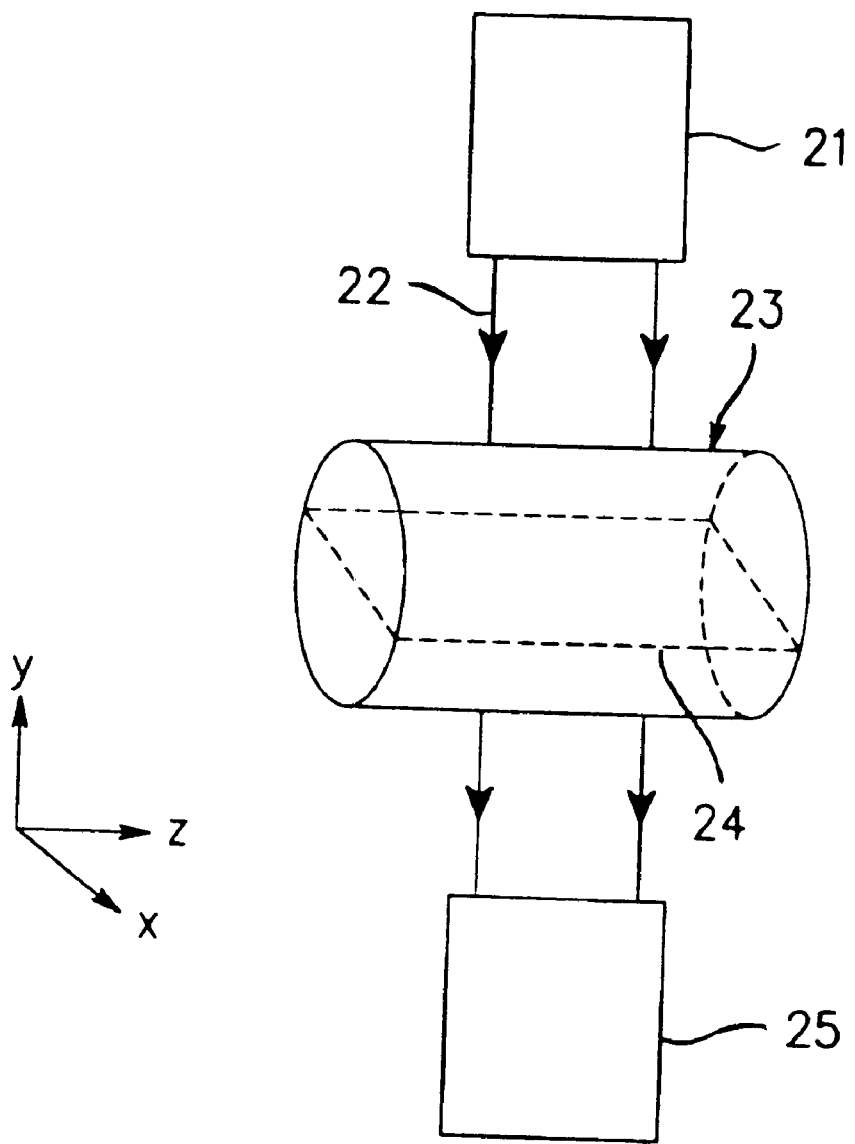
FIG. 2 illustrates a conventional device for measuring the transverse characteristics of an optical fiber.
Figure 3:
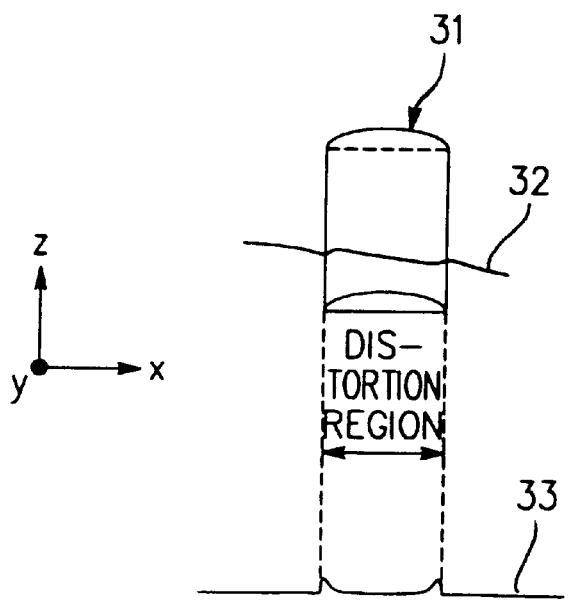
FIGS. 3, 4, and 5 illustrate the principles to which the embodiments of the present invention are applied thereto.
Figure 4:
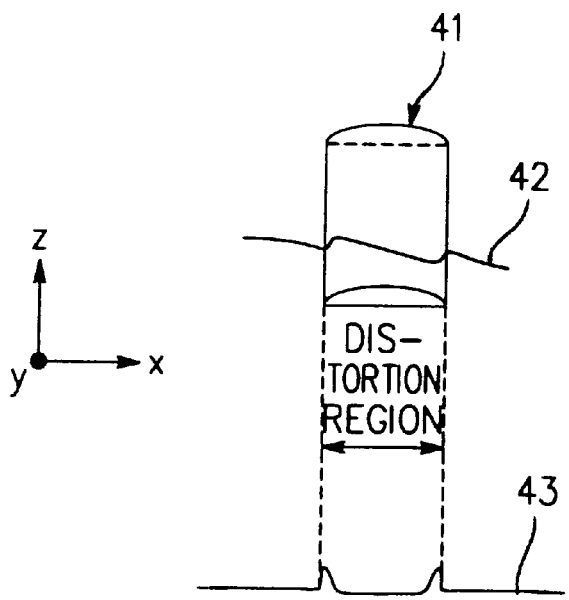
Figure 5:
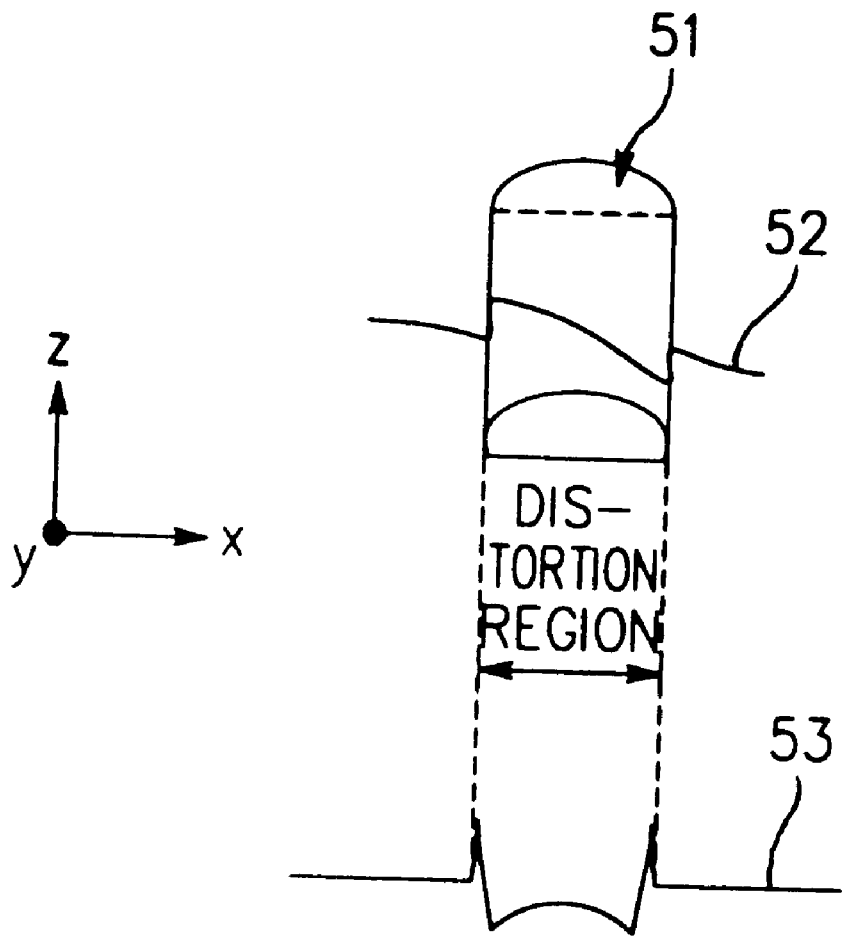

FIGS. 3, 4, and 5 illustrate the principle of the embodiments of the present invention by which the present invention relies on to measure the transverse characteristics of an optical fiber. As shown in FIG. 3, the lengthwise direction of an optical fiber 31 is aligned parallel to the z-axis, whereas the longitudinal section of the optical fiber 31 is aligned along the x-z plane. A sheet of white paper with a straight line 32 drawn thereon is disposed behind the fiber along the x-z plane. If the line 32 is aligned perpendicular to the fiber and there was no distortion in the fiber, the line 32 running along x-axis and perpendicular to the central axis of the fiber 31 would be projected as a straight line. That is, the image of the line 32 via the optical fiber 31 would be linear. However, if the line 32 is aligned obliquely at an angle other than 90°, then the line 32 would be distorted. The length of a distorted region is smaller than the diameter of the optical fiber 31. As shown in FIG. 3, the image of the line 32 via the optical fiber 31 will be curved. The distortion is severe at the boundary between the overlap portion of the line 32 and the optical fiber 31. In particular, the distorted image of the line 32 is anti-symmetrical with respect to the center of the image and includes two distortion peaks near both edges of the fiber 31. If a differential algorithm is applied to the distorted line 32, a differential curve 33 can be obtained.

Referring to FIG. 4, if the fiber 41 is spaced a part longer in the y-axis direction away from the white sheet compared to the fiber 31 of FIG. 3, the line 42 will be distorted more than the distorted line 32 shown in FIG. 3 due the lens effect by the fiber 31. Similarly, a differential curve 43 of the distorted line image can be obtained. Here, the differential curve is symmetrical with respect to the center of the image and has two distortion peaks at both edges near the distorted regions of the fiber 42. As shown in FIG. 4, the distortion peaks are higher than those shown in FIG. 3.

Referring to FIG. 5, if the fiber 51 is spaced longer in the y-axis direction away from the white sheet than the fiber 41 of FIG. 4, the line 52 is seen to be more distorted than the image of the line 42 shown in FIG. 4 due to lens effect by the fiber 41. A differential curve 53 of the distorted line image is symmetrical with respect to the center of the image and has two distortion peaks at both edges of a distortion region. The distortion peaks are higher than those of the differential line 43 shown in FIG. 4, and the length of the distortion region equals the diameter of the optical fiber 51.

As noted from FIGS. 3, 4, and 5, the image of a line has different distortion peaks and a distortion region depending on the distance between the displacement of an optical fiber relative to the straight line image being projected therefrom. In the present invention, the distance between the optical fiber relative the line image is tracked based on the distortion degree of the line image relying on the above-described principle. Then, the detected distance is measured by another testing condition with no distortion effect. By comparing these two conditions—one with the distortion effect and the other without distortion effect—the transverse characteristics of the fiber component can be derived therefrom.

Figure 6:
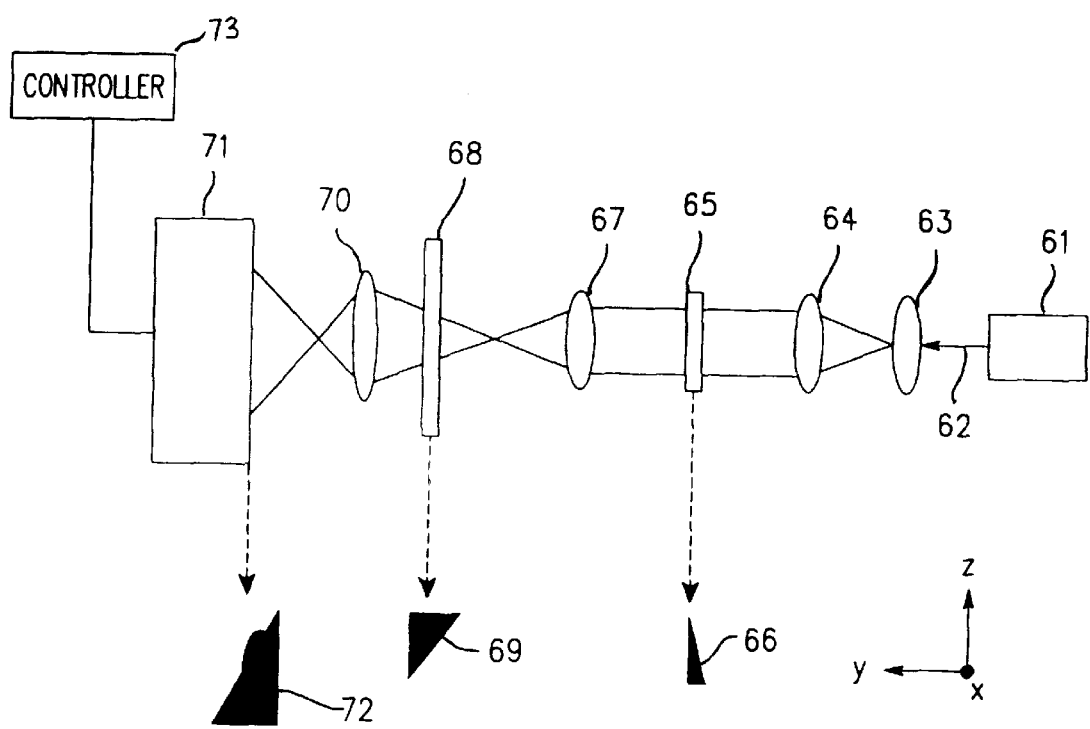
FIG. 6 illustrates an image-tracking device for measuring the transverse characteristics of an optical fiber according to a preferred embodiment of the present invention; and, FIG. 7 is a flowchart illustrating an image-tracking method for measuring the transverse characteristics of an optical fiber according to a preferred embodiment of the present invention.

Now, FIG. 6 illustrates an image-tracking device for the transverse measurement of an optical fiber according to the preferred embodiment of the present invention using the principle as described in the preceding paragraphs. The image-tracking device according to the exemplary embodiment of the present invention includes, in succession: a light source 61, a rotating diffuser 63, a collimator lens 64, a blade 65 for providing an image of a linear object 66, a first convex lens 67, an optical fiber 68, a second convex lens 70, an image sensor 71, and a controller 73. As shown in FIG. 6, the y-z plane view of the image-tracking device is arranged along the y-axis direction, except for the controller 73.

Referring to FIG. 6, the light 62, emitted from the light source 61, is incident on the rotating diffuser 63, which can be constructed by using a grounded glass. Here, a light emitting device, such as a laser diode (LD), a light emitting diode (LED), a He—Ne laser, a nitrogen laser, or a lamp can be used as the light source 61. The light 61 travels along the y-axis direction. The rotating diffuser 63 then scatters the incident light 62 to the collimator lens 64. The collimator lens 64 converts the incident light into parallel light beams. Here, a convex lens may be used as the collimator lens 64. The distance between the collimator lens 64 and the rotating diffuser 63 is set to be equal to the focusing distance of the collimator lens 64. The edge of the blade 65 is disposed to receive the output light beam from the collimator lens 64. Here, the blade 56 comprises a corner of an object like a mask slit, a wire, or a thread so that an image of a linear object 66 can be generated. To obtain the rotated primary image 69 from the linear object 66, the image of the linear object 66 is projected, via a first convex lens 67, to penetrate the optical fiber 68 at an angle other than 90° with respect to the diameter direction of the optical fiber 68.

The first convex lens 67 projects light with the image of the linear object 66 onto the outer circumferential surface of the optical fiber to generate a primary image 69 of the linear object 66. In this manner, the primary image 69 of the linear object 66 is penetrated through the optical fiber 68. Meanwhile, a second convex lens 70 converges the light passing through the optical fiber 68 to form a secondary image 72 on the light-receiving surface of the image sensor 71. As a consequence, the image sensor 71 detects the secondary image 72 of the linear object 66.

As noted from the above description, the primary image 69 of the linear object 66 is in a conjugate relationship with the secondary image 72. The secondary image 72 detected from the image sensor 71 is distorted and this distortion varies depending on the distance between the primary image 69 and the center of the optical fiber 68. Accordingly, the controller 73 derives a differential curve for the secondary image 72 represented by the image information received from the image sensor 71 similar to FIGS. 3, 4, and 5.

Hence, the controller 73 calculates the distance between the primary image 69 and the center of the optical fiber 68 according to the length of the distortion region and distortion peaks shown on the differential curve. The primary image of a linear object by a lens 67 is located in the optical fiber with a certain distance from the center of the fiber. The main purpose of calculating the distance of the length of distortion region on peak is to make the location of the primary image coincide with the center of the fiber.

After the image-tracking process, the image-tracking device may be used as a device for measuring the residual stress or refractive index distribution of the optical fiber 68 by removing the blade 65. In general, a polarizer (not shown) is required to measure the residual stress of the optical fiber 68. In the preferred embodiment, the polarizer may be disposed between the light source 61 and the rotating diffuser 63 and a waveplate (not shown) between the second convex lens 70 and the optical fiber 68. For measuring the refractive index of the optical fiber 68, a chopper (not shown) or an edge filter (not shown) may be inserted between the second convex lens 70 and the optical fiber 68.

Figure 7:
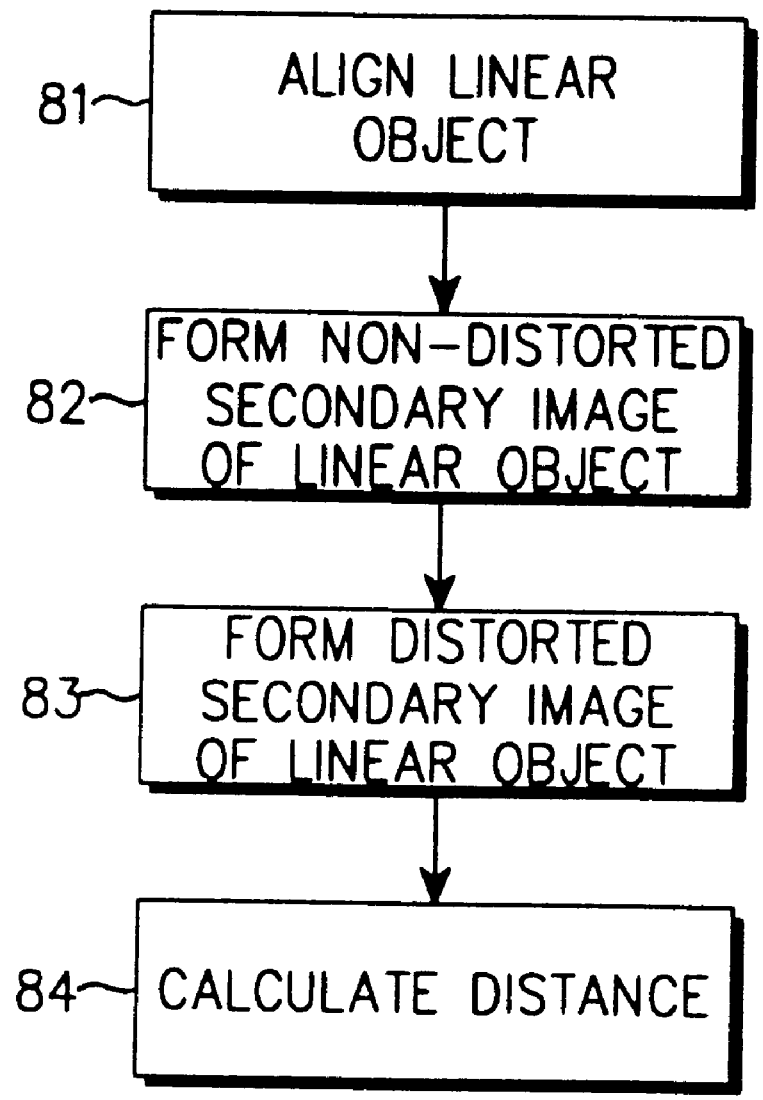

FIG. 7 is a flowchart illustrating an image-tracking method for measuring the transverse characteristics of an optical fiber according to the preferred embodiment of the present invention.

Referring to FIGS. 6 and 7, the image-tracking methods include the alignment of the linear object (step 81), formation of a non-distorted secondary linear object image (not shown) step 82), formation of the distorted secondary linear object image 72 (step 83), and distance calculation (step 84).

In step 81, the image of a linear object 66 is aligned on the optical axis at an angle between 0° and 90° with respect to the diameter direction of the optical fiber 68. Here, the optical axis is parallel to the propagation direction of the light 62 emitted from the light source 61. The optical fiber 68 must be deviated from the optical axis. After the non-distorted secondary image is formed, the optical fiber 68 is inserted to form the distorted secondary linear object image 72 in step 83. It is noted that to keep the center of the optical fiber 68 at the position of the primary image 69 of the linear object 66, the image of the linear object 66 and its non-distorted secondary image must be in the complete conjugate relationship.

In step 82, the linear object 66 is set in the conjugate relationship with the non-distorted secondary image formed on the light receiving surface of the image sensor 71 using the first and second convex lenses 67 and 70, shown in FIG. 6. This can be done by controlling the linear object 66 along the optical axis and thus positioning the primary image 69 of the linear object 66 along the optical axis via the first convex lens 67. Alternatively, the second convex lens 70 may be controlled or the image sensor 71 may be defocused to achieve the same effect.

In step 83, the light 62 that has passed through the optical fiber 68 is converged and he distorted-secondary image 72 of the linear object 66 is generated. That is, the distorted secondary image 72 for the primary image 69 as an object is formed using the second convex lens 70. The center of the optical fiber 68 is controlled to be at the position of the primary image 69 by reflecting the analysis result of the distorted secondary image 72 in positioning the optical fiber 68 on the optical axis.

In step 84, the distorted secondary image 72 is detected using the image sensor 71 and the distance between the primary image 69 and the center of the optical fiber 68 is calculated from the distortion degree of the detected secondary image 72. This is done to obtain the movement value of the optical fiber 68 before the non-distorted secondary image was formed and after the distorted secondary image was formed in response to the insertion of fiber 68. Here, the distortion degree of the distorted secondary image 72 can be calculated by deriving a differential curve for the secondary image 72 to determine the length of a distortion region and distortion peaks. That is, the distance between the primary image 69 and the center of the optical fiber 68 is calculated from the values indicative of the distortion degree of the secondary image 72.

As described above, the image-tracking device and method for the transverse measurement of an optical fiber according to the present invention can minimize measurement errors and automate the transverse measurement of an optical fiber by evaluating the alignment state of an optical fiber using images of a linear object.

While the invention has been shown and described with reference to a certain preferred embodiment thereof, it will be understood by those skilled in the art that various changes in form and details may be made therein without departing from the spirit and the scope of the invention as defined by the appended claims.

What is claimed is:

1. An image-tracking device for measuring the transverse characteristics of an optical fiber, comprising:

a linear object used to generate an image;

a light source for emitting light onto said linear object;

a first convex lens for projecting the light passing through said linear object onto the outer circumferential surface of said optical fiber and for generating a primary image of said linear object;

a second convex lens for converging the light passing through said optical fiber and for generating a secondary image that differs from said primary image;

an image sensor for detecting said secondary image; and, a controller coupled to said image sensor for calculating the distance between said primary image and the center of said optical fiber based on the distortion degree of said secondary image.

2. The image-tracking device of claim 1, wherein the image of said linear object is projected to said optical fiber at a non-perpendicular angle.

3. The image-tracking device of claim 1, further comprising a rotating diffuser for scattering the light emitted from said light source, and a collimator lens coupled to convert the scattered light from said rotating diffuser into parallel light, said collimator lens projecting said parallel light onto said linear object.

4. The image-tracking device of claim 1, wherein said controller derives a differential curve for said detected secondary image and calculates the distance between said primary image and the center of said optical fiber according to the length of a distortion region and distortion peaks on said derived differential curve.

5. An image tracking method for measuring the transverse characteristics of an optical fiber, the method comprising the steps of:

arranging a linear object to be inclined at an angle other than 90° with respect to the diameter direction of said optical fiber;

projecting light onto said linear object and converging the light passing through said linear object;

generating a primary image of said linear object to penetrate said optical fiber;

generating a secondary image of said linear object by converging the light passing through said optical fiber;

detecting said secondary image and deriving a differential curve based on said detected secondary image; and, calculating the distance between said primary image and the center of said optical fiber according to the length of a distortion region and distortion peaks on said derived differential curve.

* * * * *